United States Patent
Casasola et al.

(10) Patent No.: US 9,736,310 B2
(45) Date of Patent: Aug. 15, 2017

(54) ADJUSTABLE INTERACTIVE VOICE RESPONSE SYSTEM

(71) Applicant: Wal-Mart Stores, Inc., Bentonville, AR (US)

(72) Inventors: Jose Casasola, Bentonville, AR (US); John Ragsdale, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/270,203

(22) Filed: Sep. 20, 2016

(65) Prior Publication Data
US 2017/0085714 A1    Mar. 23, 2017

Related U.S. Application Data

(60) Provisional application No. 62/221,419, filed on Sep. 21, 2015.

(51) Int. Cl.
*H04M 1/64* (2006.01)
*H04M 3/527* (2006.01)
*H04M 3/493* (2006.01)

(52) U.S. Cl.
CPC ......... *H04M 3/527* (2013.01); *H04M 3/4938* (2013.01)

(58) Field of Classification Search
CPC .... H04M 3/537; H04M 3/4938; H04M 3/493; H04M 3/5166; H04M 2201/40
USPC .................................. 379/70, 88.11
See application file for complete search history.

(56) References Cited

U.S. PATENT DOCUMENTS

| | | |
|---|---|---|
| 6,718,017 B1 | 4/2004 | Price et al. |
| 6,834,100 B2 | 12/2004 | Reynolds |
| 7,515,695 B1 * | 4/2009 | Chan ............... H04M 3/493 379/221.09 |
| 7,529,538 B2 | 5/2009 | Espejo et al. |
| 7,623,644 B2 | 11/2009 | Bjornberg et al. |
| 7,907,714 B2 | 3/2011 | Baniak et al. |
| 8,019,057 B2 | 9/2011 | Sharma |
| 8,699,674 B2 * | 4/2014 | Bouzid ............. H04M 3/493 379/88.01 |
| 2007/0140466 A1 * | 6/2007 | Sharma ............ H04M 3/493 379/235 |
| 2013/0046543 A1 | 2/2013 | Kitchens et al. |

FOREIGN PATENT DOCUMENTS

WO    2013147718 A2    10/2013

* cited by examiner

*Primary Examiner* — Van D Huynh
(74) *Attorney, Agent, or Firm* — McCarter & English, LLP; David R. Burns; John S. Curran

(57) ABSTRACT

Provided herein are methodologies, systems, apparatus, and non-transitory computer-readable media for providing an adjustable interactive voice response (IVR) system. User identification information is received in order to determine which portions of an IVR system the user can access. The user can then search the IVR system based on a search term corresponding to a verbal phrase recognizable in the IVR system. The user can enter the search term via a GUI displayed on an electronic device. A listing of audio files or options files corresponding to the verbal phrase is then transmitted to the electronic display device. A new verbal phrase to be recognized in the IVR system is then received from the user, and a system flow including at least one of the audio files or options files is modified to correspond to the new verbal phrase.

24 Claims, 7 Drawing Sheets

US 9,736,310 B2

ADJUSTABLE INTERACTIVE VOICE RESPONSE SYSTEM

RELATED APPLICATIONS

This application claims priority to U.S. Provisional Patent Application Ser. No. 62/221,419 entitled "ADJUSTABLE INTERACTIVE VOICE RESPONSE SYSTEM," filed on Sep. 21, 2015, the content of which is hereby incorporated by reference in its entirety.

BACKGROUND

In general, interactive voice response (IVR) systems can identify certain verbal words or phrases and provide a flow for directing calls. This processing flow for handling IVR input and the subsequent responses is known as a "system flow". Certain existing IVR systems allow adjustment of the IVR system flow parameters by editing the IVR system code and re-compiling the edited IVR system code.

BRIEF SUMMARY

Exemplary embodiments of the present invention provide systems, methods, and devices for providing an adjustable IVR system.

In accordance with exemplary embodiments, a method of providing an adjustable interactive voice response (IVR) system is disclosed. The method includes receiving, over a network from a user, identification information relating to the user. The method further includes providing the user with access to files within the IVR system in response to validation of the identification information. The method further includes receiving from the user a search term corresponding to a verbal phrase recognizable in the IVR system, the received search term provided by the user via a displayed graphical user interface provided on an electronic device accessed by the user. The method further includes transmitting to the electronic device at least one of a listing of audio files and options files corresponding to the verbal phrase recognizable in the IVR system, the at least one of a listing of audio files and options files displayed on the graphical user interface. The method further includes receiving from the user a new verbal phrase to be recognized in the IVR system and modifying a system flow including at least one of the audio files or options files to correspond to the new verbal phrase.

In accordance with exemplary embodiments, an adjustable IVR system is disclosed including one or more servers programmed to receive, over a network from a user, identification information relating to the user. The one or more servers are further programmed to provide the user with access to files within the IVR system in response to validation of the identification information. The one or more servers are further programmed to receive from the user a search term corresponding to a verbal phrase recognizable in the IVR system. The received search term is provided by the user via a displayed graphical user interface provided on an electronic device accessed by the user. The one or more servers are further programmed to transmit to the electronic device at least one of a listing of audio files and options files corresponding to the verbal phrase recognizable in the IVR system. The listing of audio files and options files is displayed on the graphical user interface. The one or more servers are further programmed to receive from the user a new verbal phrase to be recognized in the IVR system and modify a system flow including at least one of the audio files or options files to correspond to the new verbal phrase.

Any combination or permutation of the embodiments is envisioned. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
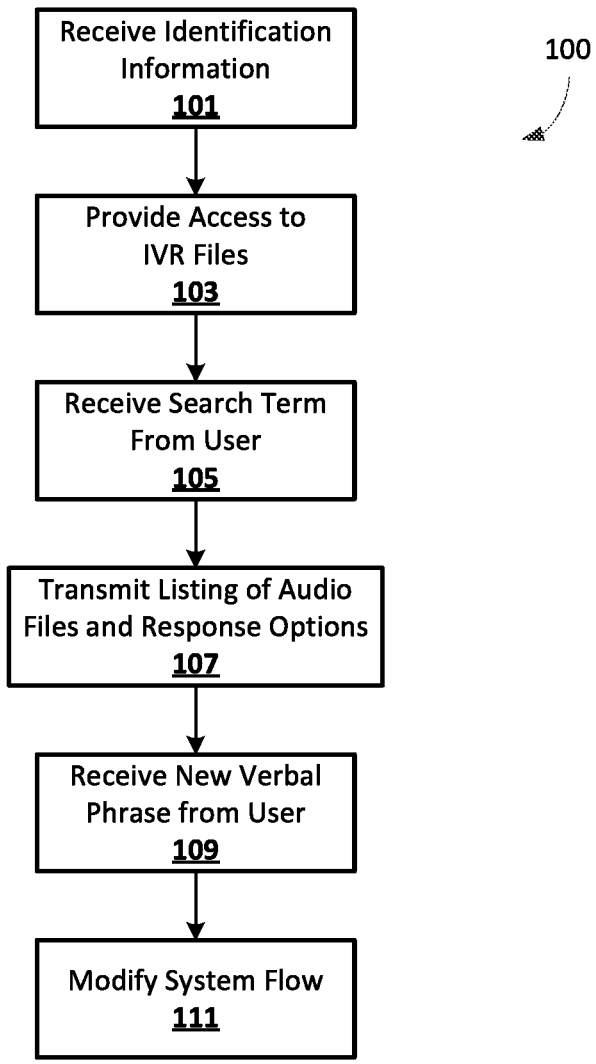
FIG. 1 is a flowchart illustrating an exemplary method of providing an adjustable IVR system, according to an embodiment of the present invention.

Following below are more detailed descriptions of various concepts related to, and embodiments of, inventive methods, apparatus, and systems for providing an improved IVR system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited thereto, while the term "including" means including but is not limited thereto. The term "based on" means based at least in part on.

Example methodologies, systems, apparatus, and non-transitory computer-readable media are described herein to facilitate providing an adjustable IVR system in which a user can add or remove phrases in the IVR system and adjust the system flow corresponding to those phrases. Call centers typically receive calls routed through speech recognition enabled, or dual-tone multi-frequency (DTMF) enabled IVR systems. Accordingly, IVR systems output audio files, in response to scenarios within the IVR system flow, identify phrases that are recognizable by the system, and execute various options such as directing the call to a desired destination. The techniques described herein allow users to adjust the parameters of an IVR system flow and add, remove, or modify which phrases are recognizable by the IVR system without the need to edit the code of a base IVR system, which can require programming skill, high level permissions or authorization, and cause significant delays. Additional parameters, such as error announcements, exit announcements, announcements or audio files that play for each question or as a result of an answer, the destination to which a call will transfer when a phrase is recognized, clarifying questions, confirmation announcements, the number of times a question will be repeated, what will happen if no answer is received, which words or phrases will be recognized as acceptable responses, which tones or inputs in a DTMF system will be recognized as acceptable responses, etc. may all be added, deleted, or modified by editing the text of a properties file.

According to exemplary embodiments, a base IVR system provides the underlying generic code that covers most applications. This generic code provides the foundation for the IVR system. A properties file is identified based on initial parameters, such as which number a caller used to access the IVR system. An IVR adjustment module interacts with the base IVR system and pulls values from the appropriate properties file in order to set the variables within the base IVR system, and therefore determine the IVR call flow. In some embodiments, a global properties file can provide global values to certain standardized or widely accepted variables within the base IVR system. One such example includes repeating a previous message or question after a caller inputs "*" on a touch-tone phone. In such embodiments, a particular or customized properties file can overwrite global values and/or provide more specific or customized values to variables within the base IVR system based on the initial call parameters. For example, more customized parameters can include which audio files to play in response to certain caller inputs, or which words or phrases will be acceptable answers for a given question. Any variables not accounted for by the properties file or files can be set to default values, or left blank, in various embodiments.

According to exemplary embodiments, once a call is received, a greeting announcement or instructions are broadcast to the caller. The greeting, as well as initial call parameters, can be determined based on, for example, which number the caller dialed or which number the user is calling from. The initial call parameters include values that are used to identify a properties filename and location to the IVR adjustment module. The IVR adjustment module then accesses the appropriate properties file at the indicated location and fills in the appropriate values within the base IVR system based on the values within the properties file. These values identify which announcements or audio files should be played, which options files should be accessed, etc. The IVR system then prompts the caller for input using the appropriate announcement or audio file, and valid options are set using the appropriate options file. The caller's response is then analyzed and an action is determined. Example actions can include ending the call, playing an error announcement, transferring the call, requesting confirmation, proceeding to ask a new question, etc. Any adjustment to the properties file will allow the IVR adjustment module to update values within the base IVR system, and thus edit or modify the IVR system flow without accessing the IVR system code.

By separating the parameters of an IVR system into a separate properties file, a user can edit parameters of an IVR system by simply modifying, deleting, or adding values within the properties file, instead of accessing and editing the code of an IVR system. Rather than requiring programming skill and access to the underlying IVR code, a user only needs access to the properties file and knowledge of the values to modify within that file. Another benefit of using the IVR adjustment module in connection with the base IVR system and IVR properties files is that a user will no longer need to re-compile the code of an entire IVR system in order to implement desired changes. Additionally, the use of an IVR adjustment module and a locally stored properties file allows for an IVR system to be updated and/or modified without the need to access external databases and create additional network traffic.

According to exemplary embodiments, a graphical user interface (GUI) can be provided to a user in order to add, remove, or modify various parameters of the IVR system without the need to access the actual properties file itself. For example, a GUI can provide a number of input fields, such as text input fields or drop-down menus, that allow a user to edit the recognizable phrases, response options, or other parameters of an IVR system flow retrieved from the properties file. In one embodiment, a user may be prompted to enter a customer login, which identifies the user and determines which portions of an IVR system the user is able to access and/or edit. Once a user's credentials have been authenticated, the user is then allowed to search the IVR system, using the GUI, based on keywords or phrases. In exemplary embodiments, once a user enters a search term, the IVR adjustment module performs a search of the properties files, which are saved on one or more local servers. As discussed above, the properties files include values that are used, among other things, to identify which audio files and which options files or grammar files should be accessed during an IVR system flow. Accordingly, the IVR adjustment module can search the properties files for a specific term and generate a listing of audio files and options files associated with that term. Once the search is performed, the GUI presents the user with the list of audio files and options files associated with the search term.

The GUI can be a web-based tool, in exemplary embodiments, that enables a user to edit the IVR system in a test environment in order to test changes before transferring them to a product environment. Once changes have been made and validated, a feature can allow users to commit changes, or automatically generate a ticket for internal company review with a summary of the changes for subsequent approval or disapproval. Approved changes can be updated and implemented within the IVR system on a recurring basis. In exemplary embodiments, various servers can be dedicated to user identification and authentication, validation and approval of edits to the IVR system, and/or committing changes within the product environment.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an example method 100 for providing an adjustable IVR system. In step 101, a server receives identification information relating to a user over a network. The identification information is used to authenticate the user and determine which portions of the IVR system the user will be able to access and/or edit.

In step 103, the user is provided with access to a files within the IVR system. In certain embodiments, the user is provided with access to only a subset of files within the IVR system in response to validation of the identification information, the subset of files being less than all of the files within the IVR system.

In step 105, the server receives a search term from the user corresponding to a verbal phrase recognizable in the IVR system. The search term is provided by the user, in exemplary embodiments, via a GUI that can be displayed on an electronic display device. The search term may be input, for example, via a text input field and using a physical or virtual keyboard in communication with an electronic device associated with the user.

In step 107, a listing of audio files and/or options files corresponding to the verbal phrase is transmitted to the electronic device associated with the user. The audio files correspond to the questions and/or announcements output by the IVR system, and the options files correspond to the response options or actions to be executed by the IVR system. In exemplary embodiments, the listing of audio files and options files is displayed on the electronic device associated with the user via the GUI. In exemplary embodiments, the listing of audio files and options files allows a user to select one or more of those files and edit IVR system flow parameters associated with the file, using the GUI. The GUI can also provide the user with an option to add a new audio file or option file that will then be associated with the search term. Once the new file is added, the user is then able to edit IVR system flow parameters associated with the file. In exemplary embodiments, the GUI acts as an interface between the user and the parameters files associated with the audio files or options files, allowing the user to access and edit the values of the properties file via the GUI, and thus edit the IVR system flow without needing to access and edit the actual properties file itself.

In step 109, a new verbal phrase to be recognized in the IVR system is received from the user. In exemplary embodiments, the new verbal phrase is received via input from the GUI, such as text input or the selection of a new word or phrase using a drop-down menu. It will be appreciated that alternative user input techniques are envisioned and the present invention is not limited to any particular user input method, unless otherwise stated.

Inputting a new verbal phrase via the GUI allows a user to edit a value within the corresponding properties file corresponding to which verbal phrases are recognizable in the IVR system, as discussed above, without the need to access the properties file itself.

In step 111, a system flow including an audio file or an option file is modified in order to correspond to the new verbal phrase. This modification is possible, as discussed throughout this application, because the IVR adjustment module is able to pull updated values corresponding to the new verbal phrase from the properties file to supply to the base IVR system. In exemplary embodiments, modifying a system flow including the audio files includes generating a new audio file corresponding to the new verbal phrase.

Figure 2:
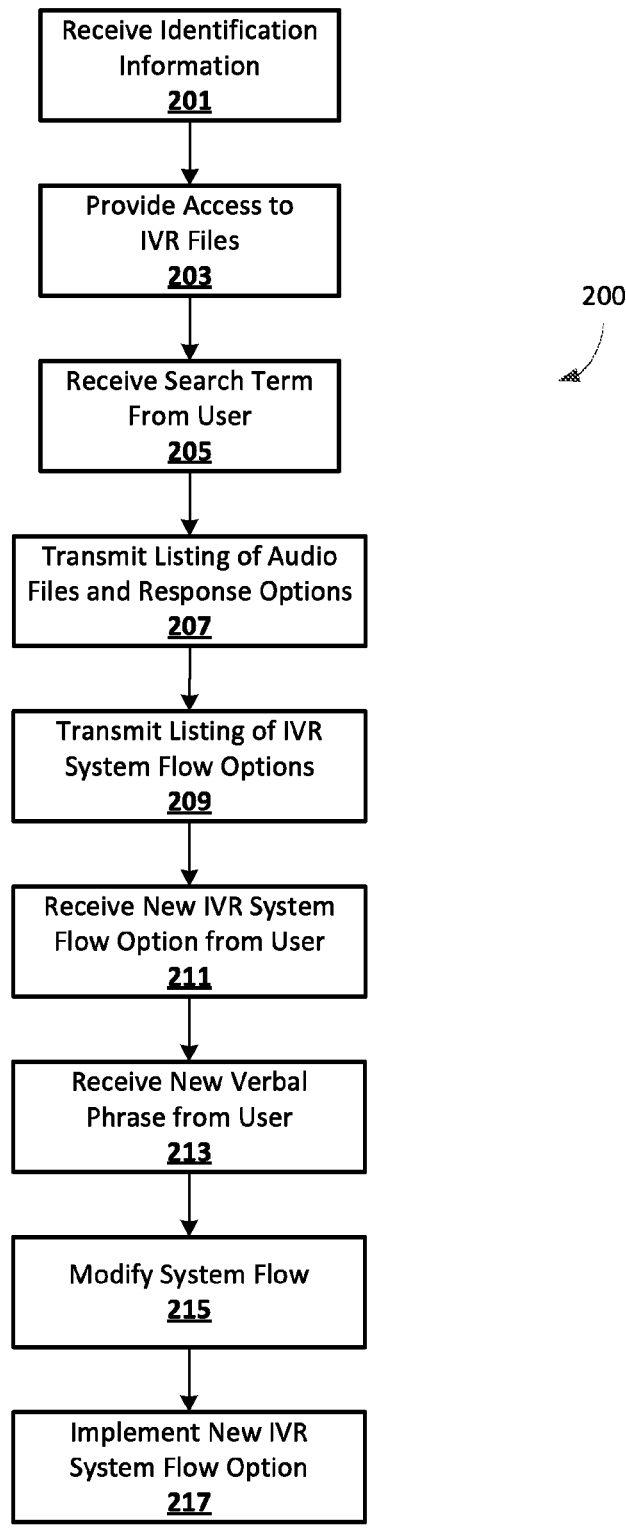
FIG. 2 is a flowchart illustrating another exemplary method of providing an adjustable IVR system, according to an embodiment of the present invention.

FIG. 2 is a flowchart illustrating an example method 200 for providing an adjustable IVR system. In step 201, a server receives identification information relating to a user over a network. The identification information is used to authenticate the user and determine which portions of the IVR system the user will be able to access and/or edit.

In step 203, the user is provided with access to a files within the IVR system. In certain embodiments, the user is provided with access to only a subset of files within the IVR system in response to validation of the identification information, the subset of files being less than all of the files within the IVR system.

In step 205, the server receives a search term from the user corresponding to a verbal phrase recognizable in the IVR system. The search term is provided by the user, in exemplary embodiments, via a GUI that can be displayed on an electronic display device. The search term may be input, for example, via a text input field and using a physical or virtual keyboard in communication with an electronic device associated with the user.

In step 207, a listing of audio files and/or options files corresponding to the verbal phrase is transmitted to the electronic device associated with the user. In exemplary embodiments, the listing of audio files and options files is displayed on the electronic device associated with the user via the GUI. In exemplary embodiments, the listing of audio files and options files allows a user to select one or more of those files and edit IVR system flow parameters associated with the file, using the GUI. The GUI can also provide the user with an option to add a new audio file or option file that will then be associated with the search term. Once the new file is added, the user is then able to edit IVR system flow parameters associated with the file. In exemplary embodiments, the GUI acts as an interface between the user and the parameters files associated with the audio files or options files, allowing the user to access and edit the values of the properties file via the GUI, and thus edit the IVR system flow without needing to access and edit the actual properties file itself.

In step 209, a listing of IVR system flow options associated with the audio files or options files corresponding to the verbal phrase recognizable in the IVR system is transmitted to the electronic device associated with the user.

In step 211, a new IVR system flow option associated with the audio files or options files is received from the user. In exemplary embodiments, the new IVR system flow option is received from the user via input from the GUI, such as the selection of an option from a drop-down menu. It will be appreciated that alternative user input techniques are envisioned and the present invention is not limited to any particular user input method, unless otherwise stated. Inputting a new IVR system flow option allows a user to edit a value within the corresponding properties file that directs the IVR adjustment module to a specific options file, as discussed above, without the need to access the properties file itself In step 213, a new verbal phrase to be recognized in the IVR system is received from the user. In exemplary embodiments, the new verbal phrase is received via input from the GUI, such as text input or the selection of a new word or phrase using a drop-down menu. It will be appreciated that alternative user input techniques are envisioned and the present invention is not limited to any particular user input method, unless otherwise stated. Inputting a new verbal phrase via the GUI allows a user to edit a value within the corresponding properties file corresponding to which verbal phrases are recognizable in the IVR system, as discussed above, without the need to access the properties file itself.

In step 215, a system flow including an audio file or an option file is modified in order to correspond to the new verbal phrase. This modification is possible, as discussed throughout this application, because the IVR adjustment module is able to pull updated values corresponding to the new verbal phrase from the properties file to supply to the base IVR system. In exemplary embodiments, modifying a system flow including the audio files includes generating a new audio file corresponding to the new verbal phrase.

In step 217, the new IVR system flow option is implemented within the IVR system. This implementation is possible because the updated values within the properties file directs the IVR adjustment module to the appropriate options file in order to incorporate the new IVR system flow option within the base IVR system.

Figure 3:
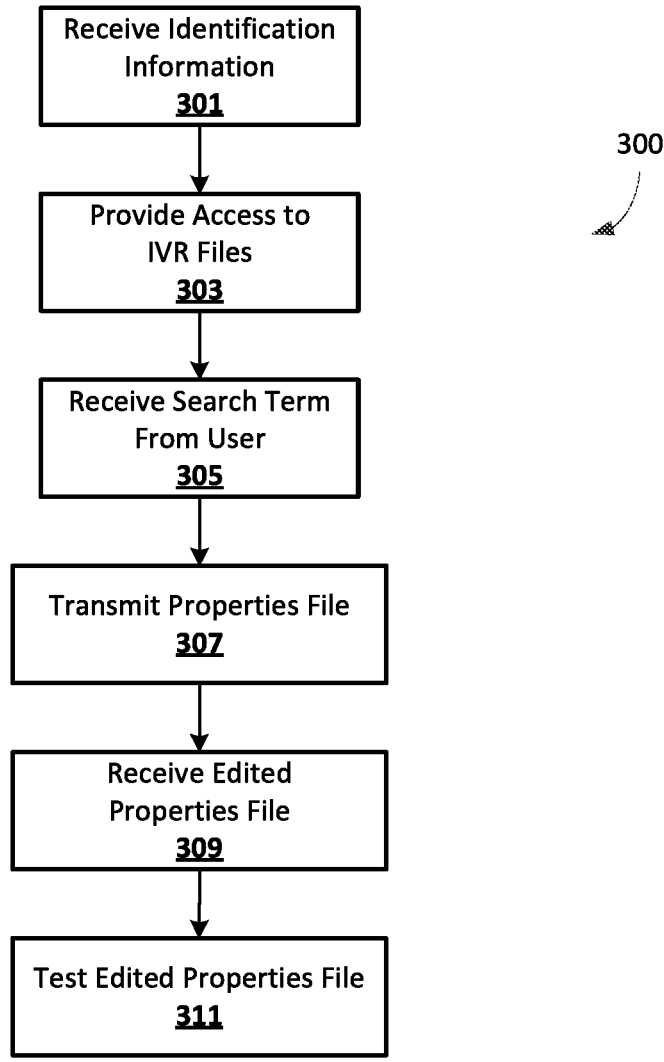
FIG. 3 is a flowchart illustrating a further exemplary method of providing an adjustable IVR system, according to an embodiment of the present invention.

FIG. 3 is a flowchart illustrating an example method 300 for providing an adjustable IVR system. In step 301, a server receives identification information relating to a user over a network. The identification information is used to authenticate the user and determine which portions of the IVR system the user will be able to access and/or edit.

In step 303, the user is provided with access to a files within the IVR system. In certain embodiments, the user is provided with access to only a subset of files within the IVR system in response to validation of the identification information, the subset of files being less than all of the files within the IVR system.

In step 305, the server receives a search term from the user corresponding to a verbal phrase recognizable in the IVR system. The search term is provided by the user, in exemplary embodiments, via a GUI that can be displayed on an electronic display device. The search term may be input, for example, via a text input field and using a physical or virtual keyboard in communication with an electronic device associated with the user.

In step 307, a properties file associated with the verbal phrase recognizable in the IVR system are transmitted to the electronic device associated with the user. As discussed above, the properties file provides an IVR adjustment module with the values corresponding to variables within the base IVR system and directs the IVR adjustment module to the appropriate audio files and options files, or .GRXML files, to be used in the IVR system flow. The audio files correspond to the questions and/or announcements output by the IVR system, and the .GRXML files correspond to the options files, which determine the appropriate options or actions to be executed by the IVR system.

In step 309, an edited properties file is received from the user, and the edited properties file is implemented within the IVR system. As discussed above, the properties file provides values, via the IVR adjustment module, to variables within the base IVR system. These values determine which audio files are output, which options files are executed, and set additional parameters corresponding to error announcements, exit announcements, announcements or audio files that play as a result of an answer, the destination to which a call will transfer when a phrase is recognized, clarifying questions, confirmation announcements, the number of times a question will be repeated, what will happen if no answer is received, which words or phrases will be recognized as acceptable responses within an IVR system, which tones or inputs in a DTMF system will be recognized as acceptable responses, etc. Accordingly, editing the properties file to include new or different values, directs the IVR adjustment module to new or different audio files or options files, and thus edits the IVR system flow.

In step 311, the edited properties file is tested prior to implementation within the IVR system. As discussed above, the properties file can be edited using a web-based GUI, such that the edits to the properties file can be implemented in a test environment before transferring them to a product environment. Once changes have been made and approved in the test environment, they can be committed or implemented within the IVR system.

Figure 4A:
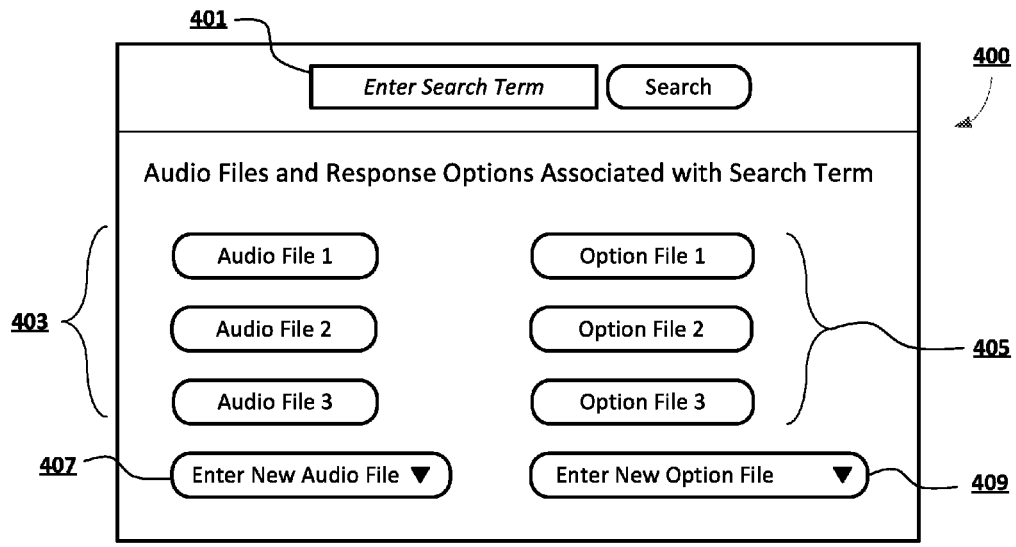
FIG. 4A depicts an exemplary graphical user interface for adjusting an IVR system, according to an exemplary embodiment of the present invention.

FIG. 4A depicts an exemplary GUI 400 for adjusting and IVR system, according to an exemplary embodiment of the present invention. As shown in this particular example, the GUI can provide a field 401 for inputting a search term in order to search the IVR system for various audio files and/or options files associated with a particular word or phrase. Once a search term has been entered and a search performed, a listing of audio files 403 associated with the search term, as well as a listing of options files 405 associated with the search term can be displayed to the user via the GUT 400. In exemplary embodiments, the audio files 403 and/or options files 405 can be accompanied by a brief description, and can be selectable using suitable user interface input (e.g., using a cursor and mouse or a touch-screen command). The GUI 400 can also allow a user to input or select a new audio file and a new option file to be associated with the search term. In this particular embodiment, a first drop-down menu 407 allows a user to select a new audio file, and a second drop-down menu 409 allows a user to select a new option file. Once an audio file is selected, either by selecting one of the already listed audio files 403, or by selecting an audio file from the drop-down menu 407, an additional GUI submenu 410 can be provided to the user, as discussed below in reference to FIG. 4B. Alternatively, if an option file is selected, either by selecting one of the already listed option files 405, or by selecting an option file from the drop-down menu 409, an additional GUI submenu 420 can be provided to the user, as discussed below in reference to FIG. 4C.

Figure 4B:
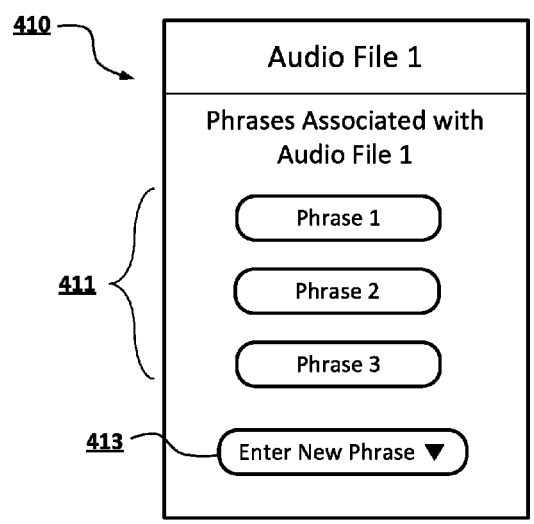
FIG. 4B depicts another exemplary graphical user interface for adjusting an IVR system, according to an exemplary embodiment of the present invention.

FIG. 4B depicts another exemplary graphical user interface 410 for adjusting an IVR system, according to an exemplary embodiment of the present invention. In this particular embodiment, the GUI 410 shows a selected audio file, "Audio File 1," along with a listing of phrases 411 that are associated with Audio File 1. In exemplary embodiments, the phrases can include the recognizable words or phrases that are accepted by the IVR system in response to an audio file being played. In this particular embodiment, the GUI 410 also allows the user to enter a new phrase via a drop-down menu 413. Adding a new phrase will associate the new phrase with the audio file so that the new phrase will be recognized as an acceptable response to the output of Audio File 1 from the IVR system. In exemplary embodiments, the audio file corresponds to an audible output from the IVR system, such as a question, and the new phrase corresponds to a new word or phrase which can be accepted in response to the question. Once a user enters a new phrase via the GUI, the user is then able to edit the parameters associated with when that phrase. Editing or adjusting the parameters associated with the new phrase is illustrated in more detail in reference to FIG. 4C below.

Figure 4C:
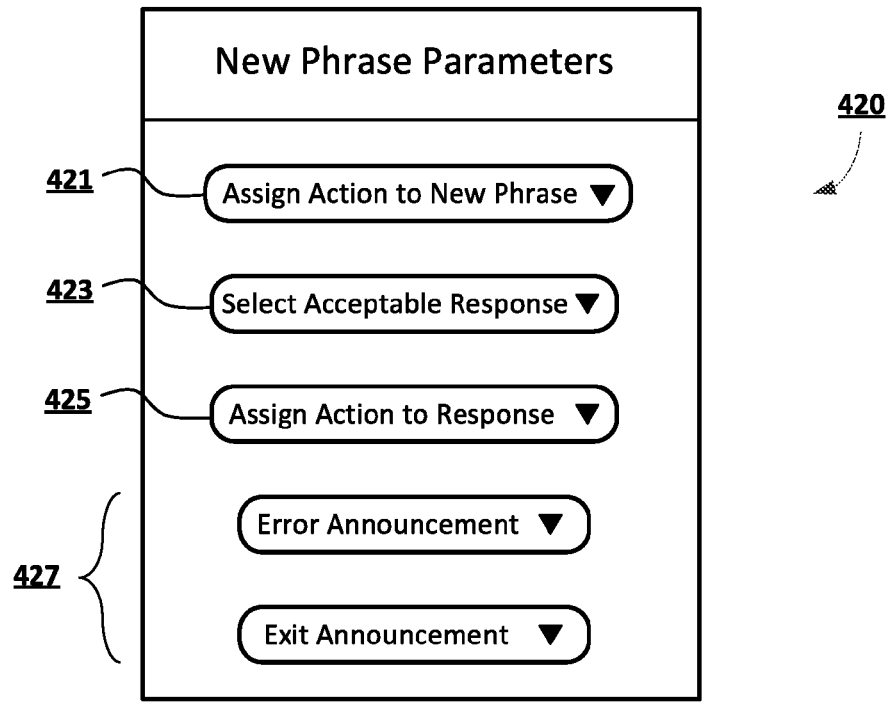
FIG. 4C depicts another exemplary graphical user interface for adjusting IVR system, according to an exemplary embodiment of the present invention.

FIG. 4C depicts another exemplary GUI 420 for adjusting an IVR system, according to an exemplary embodiment of the present invention. In this particular example, the user has chosen to add a new phrase as an acceptable or recognizable phrase within the IVR system, and the user can now determine various parameters associated with that new phrase. For example, the user can use drop-down menu 421 to assign an action that will be performed once the new phrase is recognized within a call flow. In one example embodiment, the action can include requesting additional information from the user. The user can also use drop-down menu 423 to select acceptable responses or phrases that will be recognized in response to the action selected in drop-down menu 421. In this particular embodiment, the user can also use drop-down menu 425 to assign a subsequent action in response to the acceptable response selected by drop-down menu 423. Additional parameters associated with the new phrase can be set using drop-down menus 427. These parameters include, for example, which error announcement is to be played in response to an error by the caller, as well as which exit announcement is to be played when an IVR flow is terminated. In exemplary embodiments, once the user has added or edited parameters via the GUI, the IVR adjustment module can access the appropriate properties file and edit the properties file to incorporate the changes made via the GUI. In this way, a user can add, modify, or delete parameters or values within the properties file using the GUI and without the need to directly edit the properties file.

Figure 4D:
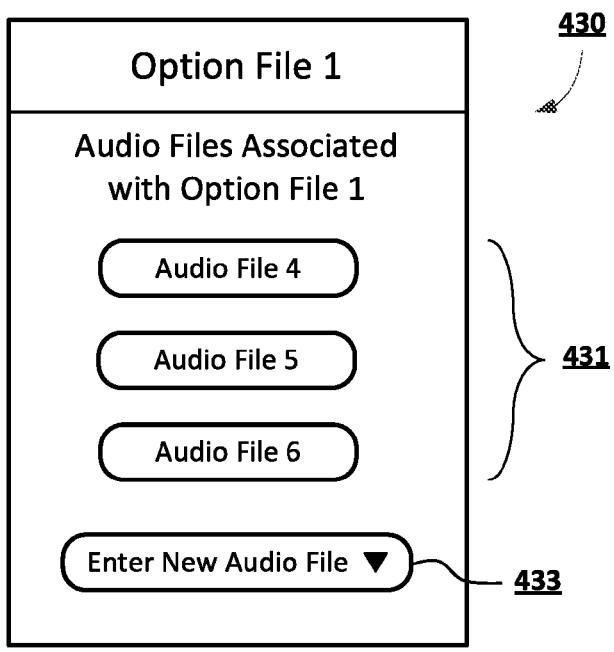
FIG. 4D depicts another exemplary graphical user interface for adjusting an IVR system, according to an exemplary embodiment of the present invention.

FIG. 4D depicts another exemplary graphical user interface 430 for adjusting an IVR system, according to an exemplary embodiment of the present invention. In this particular embodiment, the GUI 430 shows a selected option file, "Option File 1," along with a listing of audio files 431 that are associated with Option File 1. In this particular embodiment, the GUI 430 also allows the user to enter or select a new audio file via a drop-down menu 433. Adding a new audio file via the drop-down menu will associate that audio file with Option File 1 within the IVR system. In exemplary embodiments, the option file is a .GRXML file that prompts an action of the IVR system, such as transferring a call to a particular destination.

As discussed above, the various GUIs described herein can be used to alter different or additional values associated with the properties files disclosed herein. These values can determine, for example, which audio files are output, which options files are executed, and set additional parameters corresponding to error announcements, exit announcements, announcements or audio files that play as a result of an answer, the destination to which a call will transfer when a phrase is recognized, clarifying questions, confirmation announcements, the number of times a question will be repeated, what will happen if no answer is received, which words or phrases will be recognized as acceptable responses within an IVR system, which tones or inputs in a DTMF system will be recognized as acceptable responses, etc.

Figure 5:
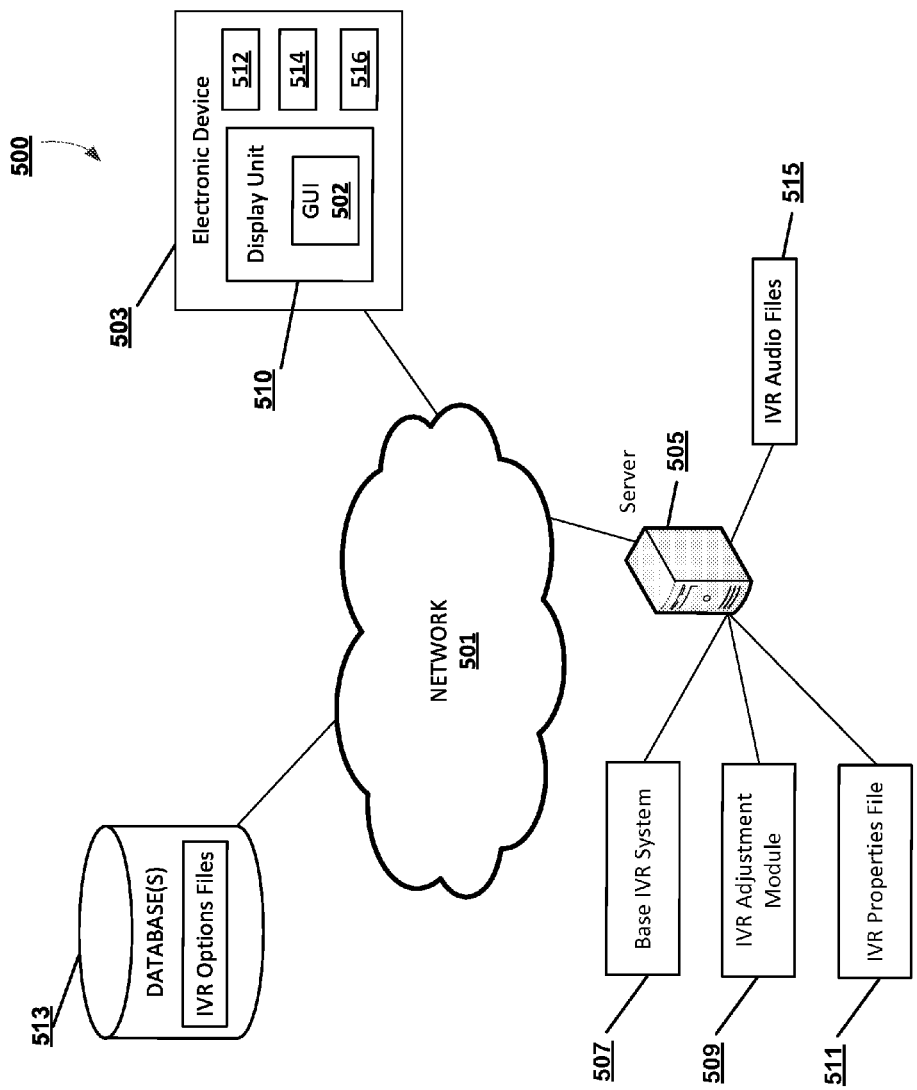
FIG. 5 is a diagram of an exemplary network environment suitable for a distributed implementation of an exemplary embodiment of the present invention.

FIG. 5 is a diagram of an example network environment 500 suitable for a distributed implementation of example embodiments. The network environment 500 can include one or more servers 505 and a database 513 associated with one or more servers 505. In exemplary embodiments, the database 513 can store the IVR options files, while the one or more servers 505 can store base IVR system 507, IVR adjustment module 509, IVR properties files 511, and audio files 515, which can implement one or more of the processes described herein with respect to FIGS. 1-3. In alternative embodiments, the IVR options files can also be stored locally at the one or more servers 505. The network environment may also include an electronic display device 503, that may display a GUI 502 to a user. The electronic display device 503 can include a display unit 510; a processing device 512; memory 514; and a network interface 516 where the processing device executes instructions in memory (e.g., in response to instructions from the one or more servers 505) to control an operation of the display unit as described herein. Once the electronic device 503 receives instructions transmitted by the one or more servers 505 (e.g., via the network interface 516), the GUI 502 may be rendered on the display unit 510 of the electronic device 503 (e.g., in response to execution of the instructions by the processing device 512) to allow a user of the electronic device 503 to interact with the server 505 or 509 to implement embodiments of the present invention.

In exemplary embodiments, the one or more servers 505, database 513, and the electronic device 503 may be in communication with each other via a communication network 501. The communication network 501 may include, but is not limited to, the Internet, an intranet, a LAN (Local Area Network), a WAN (Wide Area Network), a MAN (Metropolitan Area Network), a wireless network, an optical network, and the like. In exemplary embodiments, the electronic device 503 that is in communication with the one or more servers 505 and database 513 can generate and transmit a database query requesting information from the raw data matrices or database 513. As described above in reference to FIGS. 1-3, the one or more servers 505 can transmit instructions to the electronic device 503 over the communication network 501. The one or more servers 505 can interact with the electronic device 503 and database 513 over communication network 501 to render a GUI on an operation of the electronic device 503, as described herein. Each of the one or more servers 505, base IVR system 507, IVR adjustment module 509, and electronic device 503, can be implemented using one or more components described in reference to computing device 600 and visual display device 503, which are discussed in more detail below with respect to FIG. 6.

Figure 6:
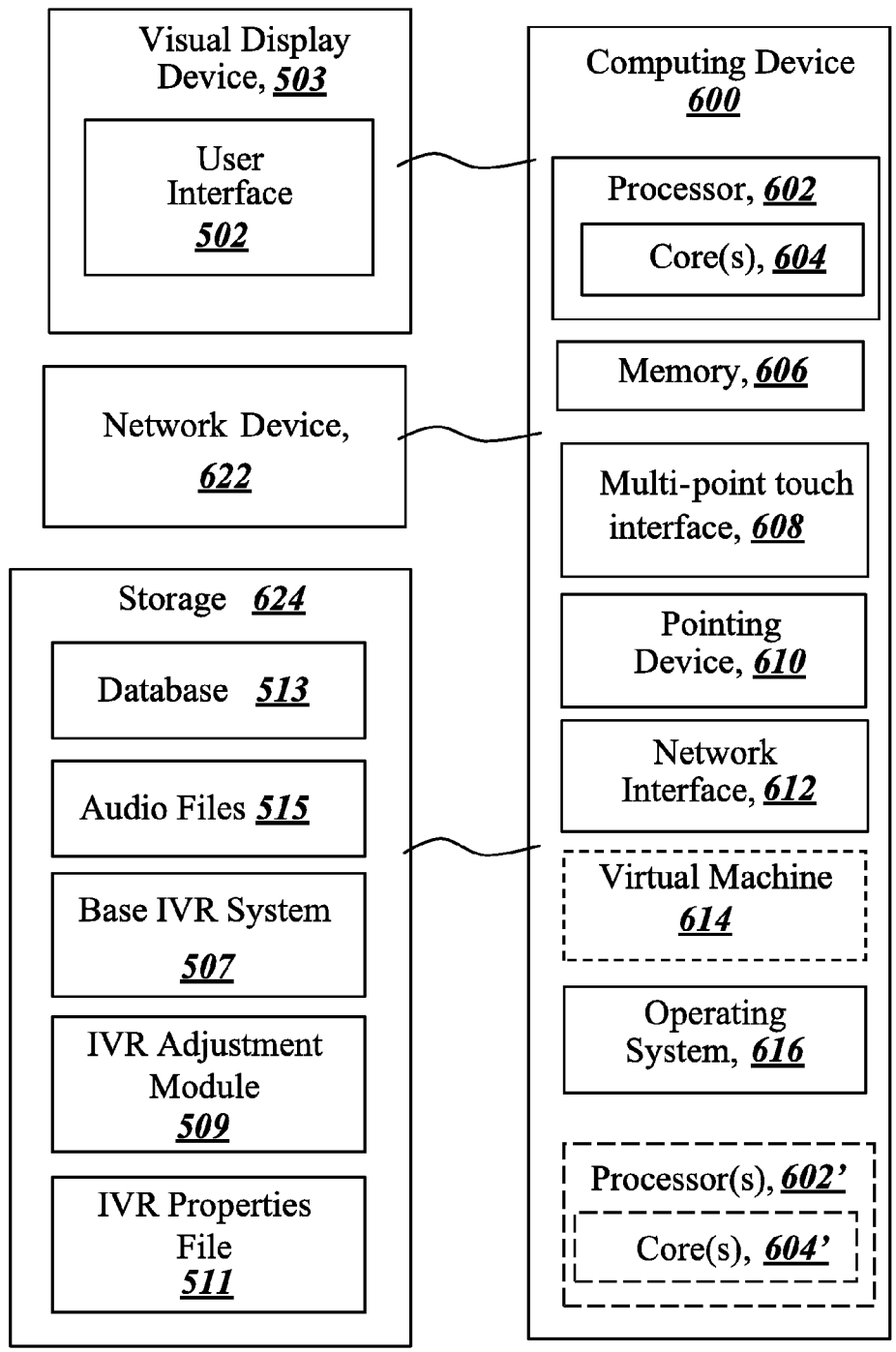
FIG. 6 is a block diagram of an exemplary computing device that can be used to perform exemplary processes in accordance with an exemplary embodiment of the present invention.

FIG. 6 is a block diagram of an exemplary computing device 600 that can be used in the performance of any of the example methods according to the principles described herein. The computing device 600 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments, such as base IVR system 507 or IVR adjustment module 509, programmed to perform processes described herein. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can be non-transitory computer-readable media including a computer system memory or random access memory, such as DRAM, SRAM, EDO RAM, and the like. Memory 606 can include other types of memory as well, or combinations thereof.

A user can interact with the computing device 600 through a visual display device 503, such as a touch screen display or computer monitor, which can display one or more graphical user interfaces 502 that can be provided in accordance with exemplary embodiments, for example, the exemplary user interfaces illustrated in FIGS. 4A-4D. The computing device 600 can include other I/O devices for receiving input from a user, for example, a keyboard or any suitable multi-point touch interface 608, a pointing device 610 (e.g., a pen, stylus, mouse, or trackpad). The keyboard 608 and the pointing device 610 can be coupled to the visual display device 503. The computing device 600 can include other suitable conventional I/O peripherals.

The computing device 600 can also include one or more storage devices 624, such as a hard-drive, CD-ROM, or other non-transitory computer readable media, for storing data and computer-readable instructions and/or software, such as the base IVR system 507, IVR adjustment module 509, IVR properties files 511, and audio files 515, which may implement exemplary embodiments of the methods and systems as taught herein, or portions thereof. In exemplary embodiments, the IVR properties files 511 are stored on a local storage device, not at a database. Exemplary storage device 624 can also store one or more databases 513 for storing any suitable information required to implement exemplary embodiments. The databases can be updated by a user or automatically at any suitable time to add, delete or update one or more items in the databases. An exemplary database 513 can store the IVR options files and any other data/information used to implement exemplary embodiments of the systems and methods described herein. In alternative embodiments, the IVR options files can be saved locally, as are the IVR properties files 511.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A method for providing an adjustable interactive voice response (IVR) system, the method comprising:
 receiving, over a network from a user, identification information relating to the user;
 providing the user with access to files within the IVR system in response to validation of the identification information;
 receiving from the user a search term corresponding to a verbal phrase recognizable in the IVR system, the received search term provided by the user via a displayed graphical user interface provided on an electronic device accessed by the user;
 transmitting to the electronic device at least one of a listing of audio files and options files corresponding to the verbal phrase recognizable in the IVR system, the at least one of a listing of audio files and options files displayed on the graphical user interface;
 receiving from the user via the graphical user interface a new verbal phrase to be recognized in the IVR system; and
 modifying a system flow including at least one of the audio files or options files to correspond to the new verbal phrase.

2. The method of claim 1, wherein modifying a system flow including at least one of the audio files includes generating a new audio file corresponding to the new verbal phrase.

3. The method of claim 1, further comprising transmitting to the electronic device a listing of IVR system flow options associated with the audio files or options files corresponding to the verbal phrase recognizable in the IVR system.

4. The method of claim 3, further comprising:
receiving from the user a new IVR system flow option associated with the audio files or options files; and
implementing the new IVR system flow option within the IVR system.

5. The method of claim 1, further comprising:
transmitting to the electronic device a properties file, audio file, and .GRXML file associated with the verbal phrase recognizable in the IVR system.

6. The method of claim 5, further comprising:
receiving an edited properties file from the user; and
implementing the edited properties file within the IVR system.

7. The method of claim 6, further comprising:
testing the edited properties file prior to implementation within the IVR system.

8. The method of claim 1 further comprising:
providing the user with access to only a subset of files within the IVR system in response to the validation of the identification information, the subset being less than all of the files within the IVR system.

9. An adjustable interactive voice response (IVR) system, comprising:
one or more servers programmed to:
receive, over a network from a user, identification information relating to the user;
provide the user with access to files within the IVR system, in response to validation of the identification information;
receive from the user a search term corresponding to a verbal phrase recognizable in the IVR system, the received search term provided by the user via a displayed graphical user interface provided on an electronic device accessed by the user;
transmit to the electronic device at least one of a listing of audio files and options files corresponding to the verbal phrase recognizable in the IVR system, the at least one of a listing of audio files and options files displayed on the graphical user interface;
receive from the user a new verbal phrase to be recognized in the IVR system; and
modify a system flow including at least one of the audio files or options files to correspond to the new verbal phrase.

10. The system of claim 9, wherein modifying a system flow including at least one of the audio files includes generating a new audio file corresponding to the new verbal phrase recognizable in the IVR system.

11. The system of claim 9, wherein the one or more servers are further programmed to transmit to the electronic device a listing of IVR system flow options associated with the audio files or options files corresponding to the verbal phrase recognizable in the IVR system.

12. The system of claim 11, wherein the one or more servers are further programmed to:
receive from the user a new IVR system flow option associated with the audio files or options files; and
implement the new IVR system flow option within the IVR system.

13. The system of claim 9, wherein the one or more servers are further programmed to transmit to the electronic device a properties file, audio file, and .GRXML file associated with the verbal phrase recognizable in the IVR system.

14. The system of claim 13, wherein the one or more servers are further programmed to receive an edited properties file from the user; and implement the edited properties file within the IVR system.

15. The system of claim 14, wherein the one or more servers are further programmed to test the edited properties file prior to implementation within the IVR system.

16. The system of claim 9 wherein the one or more servers are further programmed to:
provide the user with access to only a subset of files within the IVR system in response to the validation of the identification information, the subset being less than all of the files within the IVR system.

17. A non-transitory computer readable medium storing instructions executable by a processing device, wherein execution of the instructions provides an adjustable interactive voice response (IVR) system, the instructions when executed causing a processing device to:
receive, over a network from a user, identification information relating to the user;
provide the user with access to files within the IVR system in response to validation of the identification information;
receive from the user a search term corresponding to a verbal phrase recognizable in the IVR system, the received search term provided by the user via a displayed graphical user interface provided on an electronic device accessed by the user;
transmit to the electronic device at least one of a listing of audio files and options files corresponding to the verbal phrase recognizable in the IVR system, the at least one of a listing of audio files and options files displayed on the graphical user interface;
receive from the user a new verbal phrase to be recognized in the IVR system; and
modify a system flow including at least one of the audio files or options files to correspond to the new verbal phrase.

18. The medium of claim 17, wherein modifying a system flow including at least one of the audio files includes generating a new audio file corresponding to the new verbal phrase.

19. The medium of claim 17, wherein execution of the instructions further causes the processing device to transmit to the electronic device a listing of IVR system flow options associated with the audio files or options files corresponding to the verbal phrase recognizable in the IVR system.

20. The medium of claim 19, wherein execution of the instructions further causes the processing device to:
receive from the user a new IVR system flow option associated with the audio files or options files; and
implement the new IVR system flow option within the IVR system.

21. The medium of claim 17, wherein execution of the instructions further causes the processing device to transmit to the electronic device a properties file, audio file, and .GRXML file associated with the verbal phrase recognizable in the IVR system.

22. The medium of claim 21, wherein execution of the instructions further causes the processing device to receive an edited properties file from the user; and implement the edited properties file within the IVR system.

23. The medium of claim 17, wherein execution of the instructions further causes the processing device to test the edited properties file prior to implementation within the IVR system.

24. The medium of claim 17, wherein execution of the instructions further causes the processing device to provide the user with access to only a subset of files within the IVR system in response to validation of the identification information, the subset being less than all of the files within the IVR system.

* * * * *